United States Patent [19]
Ward et al.

[11] Patent Number: 5,808,198
[45] Date of Patent: Sep. 15, 1998

[54] RF BALANCED CAPACITIVE VIBRATION SENSOR SYSTEM

[75] Inventors: Paul A. Ward, Roslindale; William P. Kelley, Beverly, both of Mass.

[73] Assignee: The Charles Stark Draper Laboratory, Inc., Cambridge, Mass.

[21] Appl. No.: 858,522

[22] Filed: May 19, 1997

[51] Int. Cl.$^6$ .................................................. G01P 15/00
[52] U.S. Cl. ......................................... 73/514.32; 324/658
[58] Field of Search ........................... 73/514.16, 514.18, 73/514.32, 514.37, 514.61, 718, 724, 701; 324/658, 661, 679, 686

[56] References Cited

U.S. PATENT DOCUMENTS

| | | | |
|---|---|---|---|
| 3,012,193 | 12/1961 | Breen | 324/668 |
| 3,718,856 | 2/1973 | Hendricks | 324/658 |
| 4,023,413 | 5/1977 | Stauber | 73/514.32 X |
| 4,054,833 | 10/1977 | Briefer | 324/679 |
| 4,322,977 | 4/1982 | Sell et al. | 73/724 X |
| 4,457,179 | 7/1984 | Antonazzi et al. | 73/701 |
| 4,584,885 | 4/1986 | Cadwell | 73/514.18 X |
| 4,816,743 | 3/1989 | Hams et al. | 324/727 |
| 5,069,071 | 12/1991 | McBrien et al. | 73/579 X |
| 5,134,881 | 8/1992 | Henrion et al. | 73/514.18 |
| 5,311,140 | 5/1994 | Permuy | 73/765 X |
| 5,345,824 | 9/1994 | Sherman et al. | 73/514.32 X |
| 5,511,420 | 4/1996 | Zhao et al. | 73/514.18 |
| 5,537,109 | 7/1996 | Dowd | 324/658 |
| 5,581,035 | 12/1996 | Greiff | 73/514.32 |
| 5,583,290 | 12/1996 | Lewis | 73/514.32 X |
| 5,597,956 | 1/1997 | Ito et al. | 73/514.32 X |
| 5,600,066 | 2/1997 | Torregrosa | 73/514.32 X |
| 5,629,629 | 5/1997 | Tielert et al. | 73/718 X |
| 5,633,594 | 5/1997 | Okada | 73/514.32 X |
| 5,637,798 | 6/1997 | Schatz | 73/514.32 |

FOREIGN PATENT DOCUMENTS

2700614-A1  7/1994  France ................. 73/514.32

*Primary Examiner*—Ronald L. Biegel
*Assistant Examiner*—Paul D. Amrozowicz
*Attorney, Agent, or Firm*—Iandiorio & Teska

[57] ABSTRACT

An RF balanced capacitive vibration sensor system includes a carrier generator for generating an r.f. carrier and an inverted r.f. carrier; a voltage tunable capacitive vibration sensor responsive to one of the carriers; a reference capacitor responsive to the other of the carriers; a summing device for combining the outputs from the sensor and reference capacitors; a controller device for adjusting the amplitude of the carriers to tune the capacitance of the sensor to that of the reference capacitor; the sensor modulating one of the carriers with a vibration modulation signal representative of a sensed vibration; an r.f. amplifier device responsive to the summing device for amplifying the modulated carrier from the sensor; and a detector device, responsive to the modulated carrier from the r.f. amplifier, for detecting the modulation signal representative of the sensed vibration.

6 Claims, 6 Drawing Sheets

FIG. 5A $V_C$ 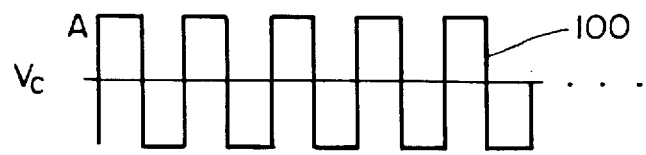
FIG. 5B $V_{ic}$ 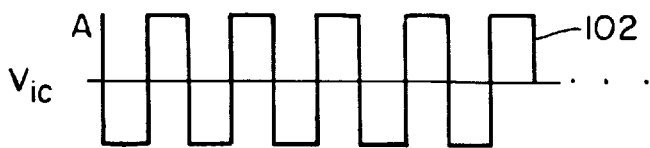
FIG. 5C $Q_S$ 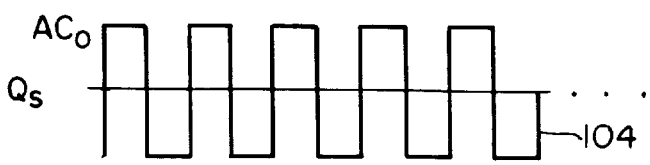
FIG. 5D $Q_R$ 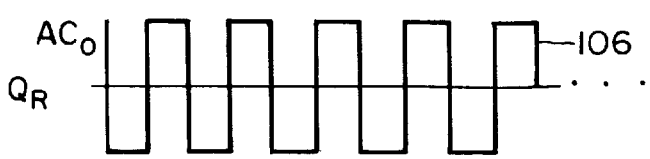
FIG. 5E $Q_T$  $Q_T = Q_S + Q_R = \phi$
FIG. 5F $V_O$ 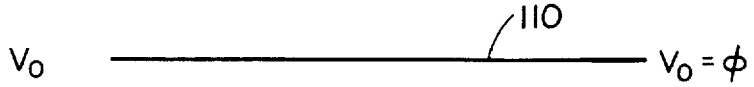 $V_O = \phi$ Note: $|X|$ denotes amplitude of X

RF BALANCED CAPACITIVE VIBRATION SENSOR SYSTEM

FIELD OF INVENTION

This invention relates to an r.f. balanced capacitive vibration sensor system.

BACKGROUND OF INVENTION

Capacitive vibration sensors or accelerometers used to sense low frequency disturbances suffer from high noise problems. Typically the sensor is formed from a capacitor one plate of which is a proof mass, with the other plate fixed to a substrate. An acceleration or vibration moves the proof-mass with respect to the fixed plate, changing the spacing and thus the capacitance of the sensor, resulting in a change in the charge. A charge amplifier creates a voltage representative of the charge. However, the charge amplifier, typically a CMOS device, inherently introduces noise at the low frequencies, 1–20,000 Hz, typically experienced by the sensors which obscures the charge sum voltage signal that represents the plate movement and thus the acceleration experienced. One attempt to solve this problem uses a large r.f. carrier to be modulated by the charge capacitive variation representative of the sensor capacitor plate movement. The r.f. carrier is typically made very large in order to produce a large signal representing the change in capacitance. However, this tends to overdrive the amplification stages which limits the amount of r.f. gain achievable. This further limits the signal-to-noise ratio.

SUMMARY OF INVENTION

It is therefore an object of this invention to provide an improved r.f. balanced capacitive vibration sensor system.

It is a further object of this invention to provide such an r.f. balanced capacitive vibration sensor system with improved signal-to-noise characteristics.

It is a further object of this invention to provide such an r.f. balanced capacitive vibration sensor system which applies high gain at frequencies where the low frequency amplifier noise will not be amplified along with the signal.

It is a further object of this invention to provide such an r.f. balanced capacitive vibration sensor system which applies high gain at r.f. rather than at the lower frequencies.

It is a further object of this invention to provide such an r.f. balanced capacitive vibration sensor system which develops modulation representative of sensed vibrations on a low amplitude r.f. signal that will not overdrive the amplifier stage.

This invention results from the realization that a truly effective low noise capacitive vibration sensor can be achieved by tuning the capacitance of the sensor to match that of a reference capacitor, driving each with inverted r.f. carriers which cancel at a summing point until a vibration changes the sensor capacitance, unmatches the sensor and reference capacitances and provides an r.f. signal modulated with a modulation signal that represents the vibration induced sensor capacitance variation that can be amplified at r.f. frequencies.

This invention features an RF balanced capacitive vibration sensor system including a carrier generator for generating an r.f. carrier and an inverted r.f. carrier, a capacitive vibration sensor responsive to one of the carriers, and a reference capacitor responsive to the other of the carriers. There is a summing device for combining the outputs from the sensor and reference capacitors and a controller device for adjusting the amplitude of the carriers to tune the capacitance of the sensor to that of the reference capacitor. The sensor modulates the one of the carriers associated with it with a vibration modulation signal representative of a sensed vibration. An r.f. amplifier device responsive to the summing device amplifies the modulated carrier from the sensor and a detector device, responsive to the modulated carrier from the r.f. amplifier, detects the modulation signal representative of the sensed vibration.

In a preferred embodiment the controller device may include an integrator device. The controller device may be responsive to the detected modulated signal from the detector device to adjust the amplitude of the carriers. The r.f. amplifier may include a charge amplifier and it may include a gain amplifier. The detector device may include a demodulator.

DISCLOSURE OF PREFERRED EMBODIMENT

Other objects, features and advantages will occur to those skilled in the art from the following description of a preferred embodiment and the accompanying drawings, in which.

Figure 4:
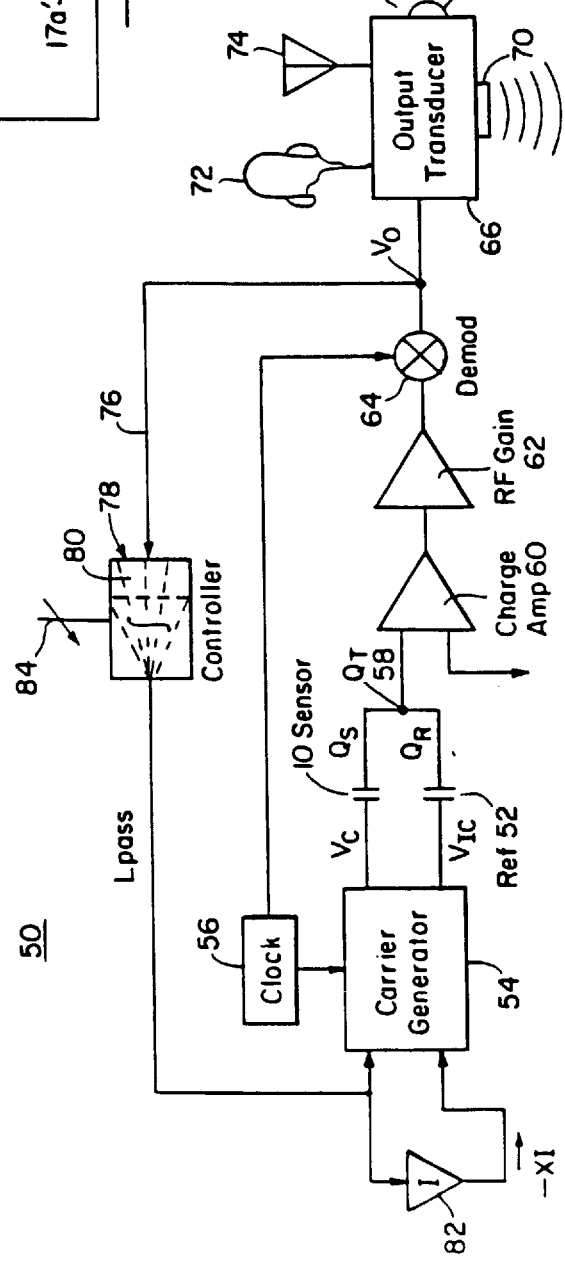
FIG. 4 is a schematic diagram of an r.f. balanced capacitive vibration system according to this invention.
Figure 6A:
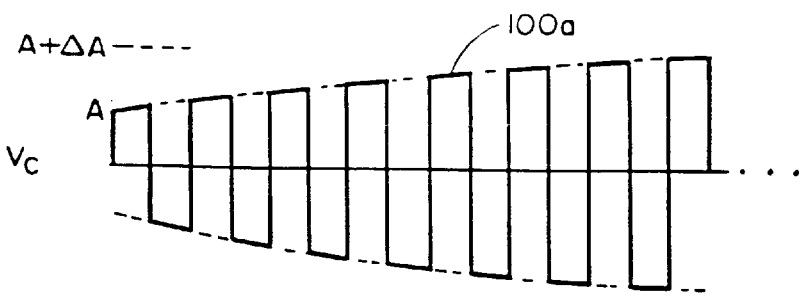
Figure 6B:
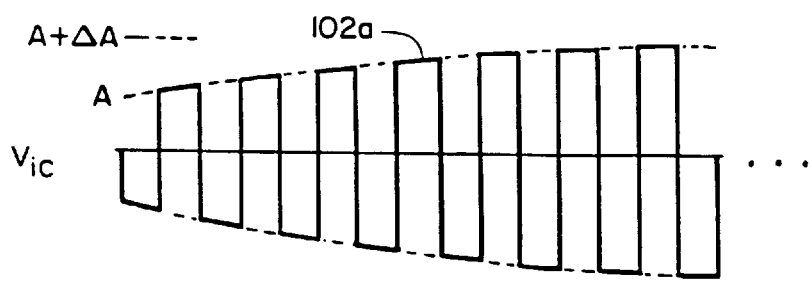
Figure 6C:
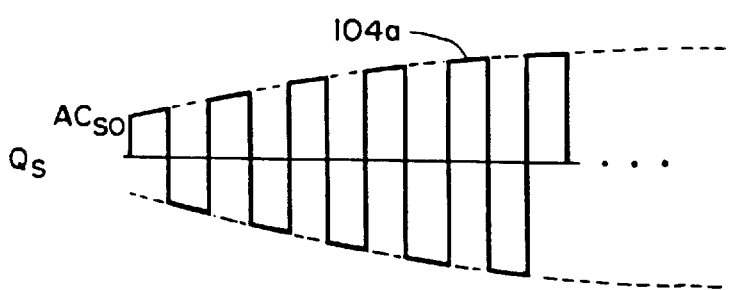
Figure 6D:
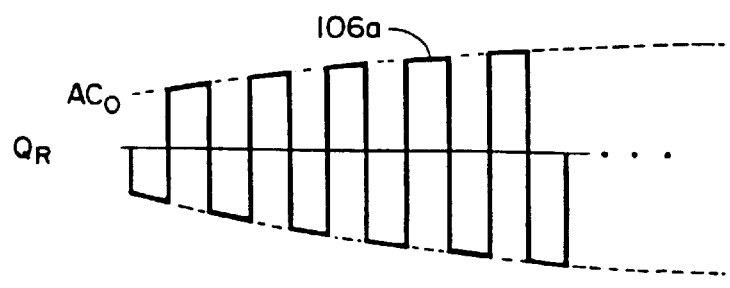
Figure 6E:
Figure 6F:
Figure 7A:
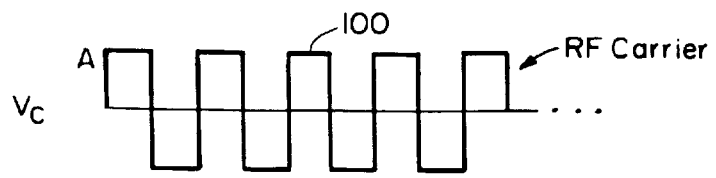
Figure 7B:
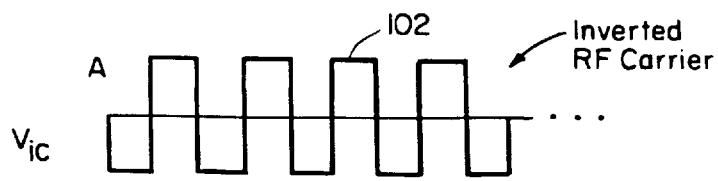
Figure 7C:
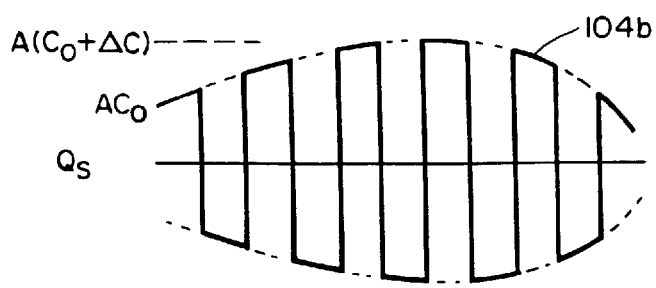
Figure 7D:
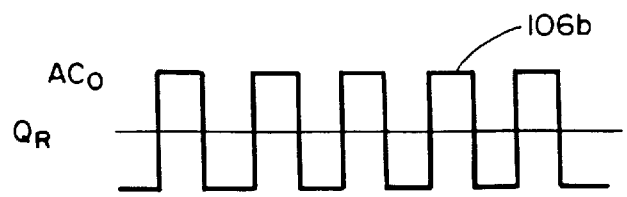
Figure 7E:
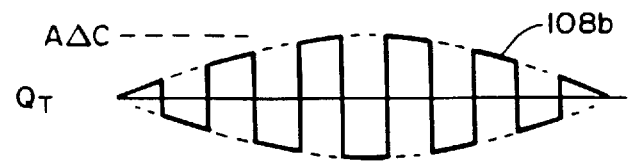
Figure 7F:
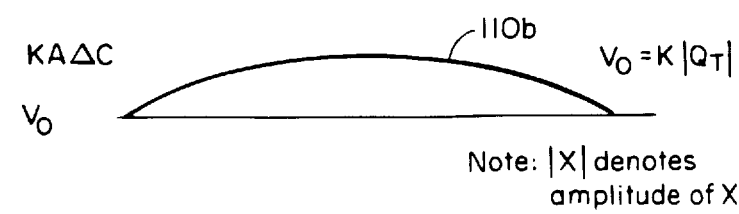
Figure 8:
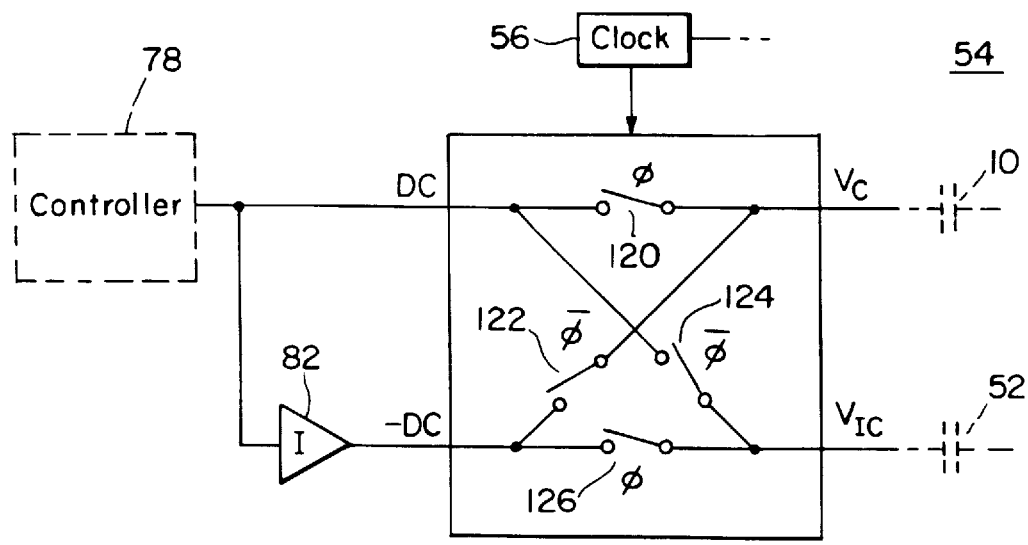

FIGS. 5A–F illustrate a number of waveforms which occur in the system of FIG. 4 in a steady state when there is no vibration sensed and the capacitances are matched;

FIGS. 6A–F are illustrations similar to FIGS. 5A–F showing the wave shapes which occur in response to an initial mismatch of the capacitances of the capacitive sensor and the reference capacitor;

FIGS. 7A–F are illustrations similar to FIGS. 5A–F and 6A–F showing the waveforms when the time-average capacitances of the capacitive vibration sensor and the reference capacitor are matched and a sinusoidal vibration input at 1000 Hz is being sensed;

FIG. 8 is a schematic diagram of the carrier generator of FIG. 4; and

Figure 9:
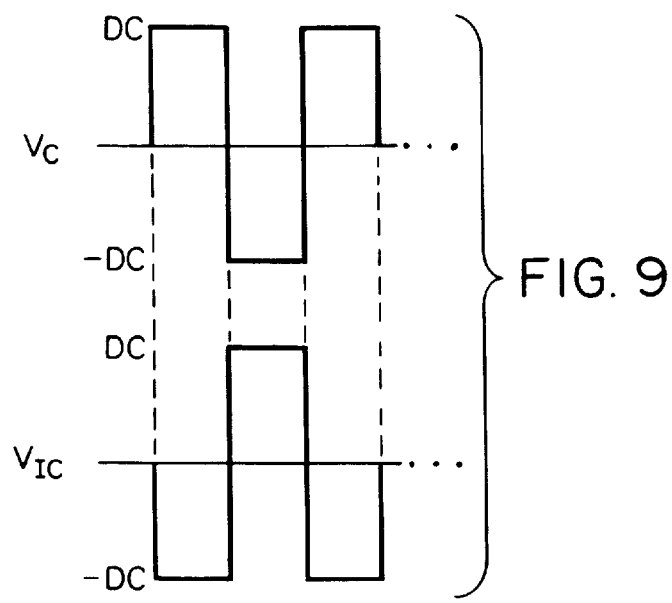

FIG. 9 is an illustration of the waveforms of the voltage outputs from the carrier generator of FIG. 8.

Figure 1:
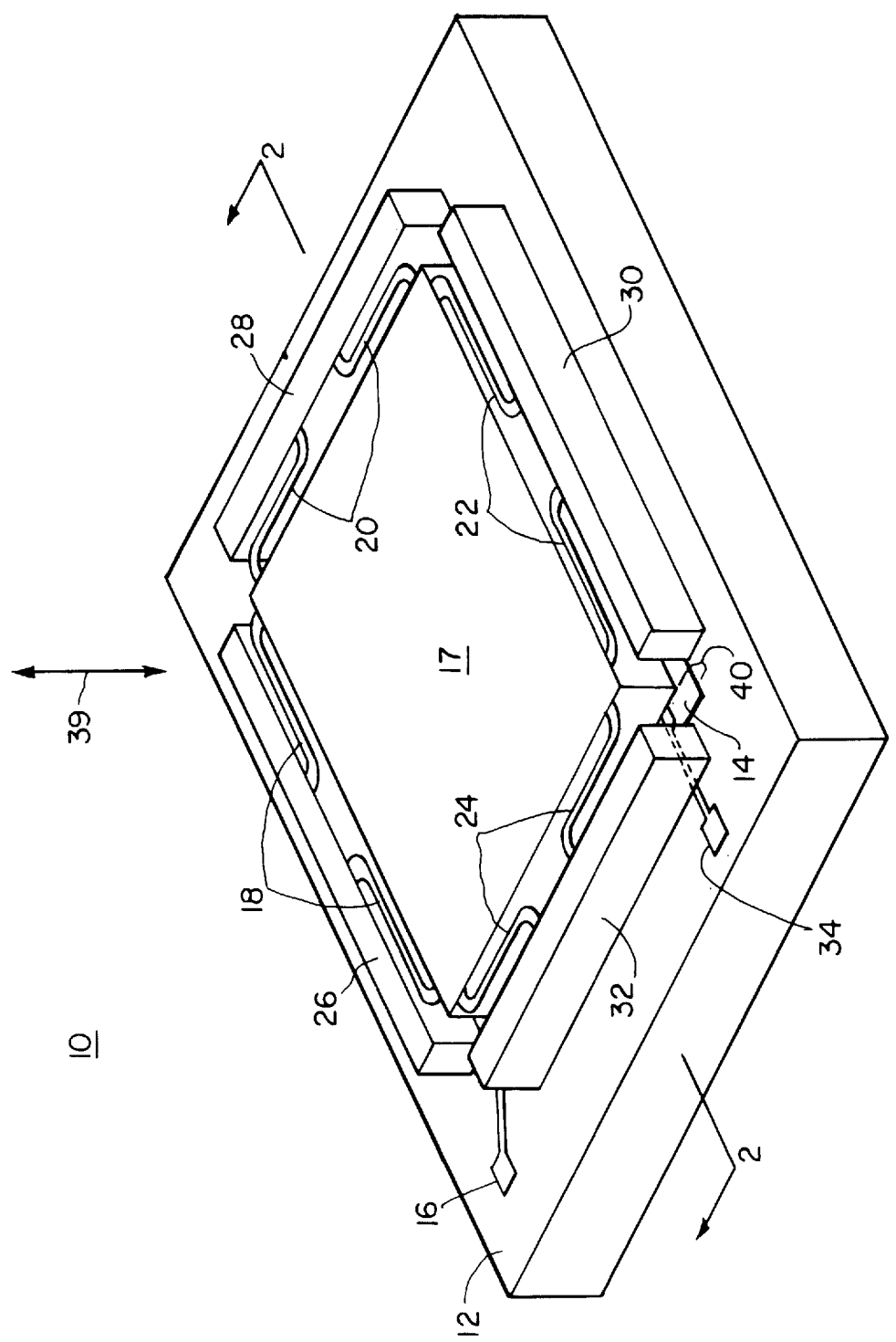
FIG. 1 is a three-dimensional view of a capacitive vibration sensor which may be utilized in the r.f. balanced capacitive sensor system according to this invention.
Figure 2:
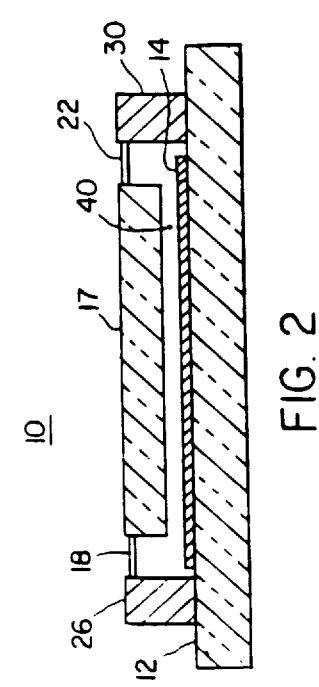
FIG. 2 is a cross-sectional view taken along lines 2—2 of FIG. 1.

There is shown in FIG. 1 a voltage tunable capacitive vibration sensor 10 which can be used with the r.f. balanced capacitive vibration sensor system of this invention. Sensor 10 includes a pyrex substrate 12 on which is mounted electrode 14 which constitutes one plate of a capacitor. Electrode 14 is connected to external circuits through contact 16. The other plate of the capacitor is constituted by proof mass 17 which is mechanically suspended by pairs of flexures 18, 20, 22 and 24 to base beams 26, 28, 30 and 32. The main sensor axis 39 is generally perpendicular to the plane of proof mass 17. External connection to proof mass 17 is made through contact 34. Proof mass/capacitor plate 17 is typically made of silicon. Any acceleration or vibration causes movement of plate 17 which changes the distance or gap 40, FIG. 2, between it and electrode 14, which changes the capacitance. This change in capacitance causes a change in charge which can be sensed as a function of the vibration or acceleration.

Figure 3:
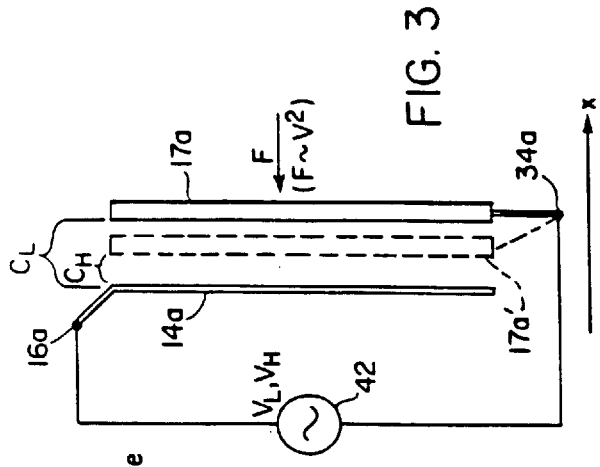
FIG. 3 is a schematic view illustrating the tunability of the voltage tunable capacitive vibration sensor of FIGS. 1 and 2.

Capacitive vibration sensor 10 is a voltage tunable capacitance. Thus when a low voltage $V_L$ is applied to contacts 16a and 34a, FIG. 3, an electric field is produced between plate or electrode 14a and plate or proof mass 17a. This field exerts a force F that draws mass 17a to within a predetermined distance of electrode 14a and establishes a certain capacitance $C_L$ for that condition. When a higher voltage $V_H$ is provided by signal generator 42 across contacts 16a and 34a, mass 17a is moved into a position indicated in phantom, 17'a which is closer to electrode 14a, thereby decreasing the gap and changing the capacitance to the value $C_H$. The force F which is applied to proof mass 17a is proportional to the square of the voltage applied.

Voltage tunable capacitive vibration sensor 10 is used in the r.f. balanced capacitive vibration sensor system 50, FIG. 4, according to this invention, where it is paired with a reference capacitor 52. A carrier generator 54 driven by a clock signal such as a 100 KHz signal from clock 56, provides a carrier voltage $V_C$ to capacitive vibration sensor 10 which produces a charge $Q_S$. An identical but inverted carrier voltage $V_{IC}$ is presented to reference capacitor 52 which results in a charge $Q_R$ being produced. The charges $Q_S$ and $Q_R$ are combined at summing point 58 to provide a total cumulative charge $Q_T$. Normally, if there is no vibration present the total at summing point 58 is zero because the capacitance of sensor 10 has been tuned to be equal to the capacitance of reference capacitor 52. However, should there be a vibration sensed by sensor 10 its capacitance changes and thus the charge $Q_S$ will change. That difference in charge, which causes a modulation of the carrier signal, appears at summing point 58 because of the difference between the charges $Q_S$ and $Q_R$. This charge is amplified, for example in charge amplifier 60, and further gain may be supplied by an r.f. gain amplifier 62. The r.f. carrier signal is provided to demodulator 64 which detects the modulating signal imposed on the charge from sensor 10 and delivers it as the output voltage $V_O$, which represents the vibration that has been sensed by sensor 10. Voltage $V_O$ is delivered to output transducer 66 which may provide a visual display such as light 68, an audio tone emitted by transducer 70 or heard through, for example, earphones 72, or a signal may be broadcast over antenna 74 to a remote unit.

In order to keep voltage tunable capacitance vibration sensor 10 tuned to the capacitance of reference capacitor 52, the detected a.c. modulation signal is fed back on line 76 to a controller device 78 which may include, for example, an integrator 80. The output of integrator 80, a d.c. level, is applied to one input of carrier generator 54 and through an inverter 82 is applied to the other input of carrier generator 54. Integrator 80 results in a frequency-dependent response to vibration whereby perturbations of vibrations below a certain frequency are substantially attenuated at the output of the system. For example, with integrator 80 set by conventional adjustment 84 to eliminate vibrations of one cycle per second or less, only vibrations above one cycle per second will appear at $V_O$ without attenuation. Any vibrations of one cycle per second or less are attenuated by controller 78. For example, a change in some ambient condition or in the orientation or gravitational field that affects proof mass 17a will cause a slight movement of mass 17a and thereby change the capacitance of sensor 10. When this occurs, that slight imbalance is detected at summing point 58 and it appears as $V_O$, as previously explained. However, since it is a low-frequency vibration, controller device 78 provides an output to cancel the low frequency vibration (decrease). The voltage output of controller 78 will change so that the voltage input to carrier generator 54, both directly and through inverter 82, is changed. This changes the force F, FIG. 3, on the proof mass, resetting the capacitance of sensor 10 until it is equal to the capacitance of reference capacitor 52, thereby nulling out the signal at the output and returning $V_O$ to zero. By providing at summing point 58 a carrier signal in the r.f. range which bears the modulation signal representative of a vibration sensed by sensor 10, the amplification in amplifier 60 and/or 62 can take place at higher frequencies in the r.f. range, where the signal can be highly amplified without decreasing the signal-to-noise ratio.

The r.f. balanced capacitive vibration sensor system 50, FIG. 4, can be viewed as operating in three modes: steady state, wherein there is no vibration and the capacitors are matched; a tuning state, in which the capacitors are initially mismatched; and a vibration detection state in which the time-average capacitances are matched and the vibration will be sensed.

In the steady state, FIGS. 5A–F, carrier signal $V_C$ 100 and the inverter carrier signal $VI_C$ 102 are identical but 180° out of phase and have the amplitude A. Charges $Q_S$ 104 and $Q_R$ 106 are also equal but opposite phase and have an amplitude determined by the voltage A times the capacitance $C_O$ of capacitive sensor 10. The total charge $Q_T$ 108, which is the total of $Q_S$ and $Q_R$ is at this state at a level of zero, as is the output voltage 110.

In the tuning state, FIGS. 6A–F, the output of controller 78 is increasing so that the amplitude of $V_C$ 100a is increasing (to a level of A+ΔA) as is the amplitude of $V_{IC}$ 102a. It follows then that the amplitudes of the charges $Q_S$ 104a and $Q_R$ 106a are also increasing. The sum of the two charges 108a thus begins as a substantial signal but tapers off once again to zero as the voltage increase (decrease) provided to $V_C$ and $V_{IC}$ changes the capacitance and thus the charge $Q_S$ on a capacitive sensor 10 in order to once again match the capacitance of reference capacitor 52. Output voltage 110a follows the same diminishing response.

With the system settled and the time-average capacitances matched, the system is in the vibration detection state, FIGS. 7A–F, in which the carrier signals $V_C$ 100 and $V_{IC}$ 102 appear as usual. Now a vibration, however, has caused a perturbation in the waveform 104b of the charge $Q_S$ on sensor 10. In contrast, that vibration has caused no charge on the reference capacitor 52 and so its charge $Q_R$ 106 remains the same. The sum of the two, the charge $Q_T$ 108b, is then converted to a voltage and amplified by amplifiers 60 and 62 and then detected in demodulator 64 using the same clock signal from clock 56 to obtain the output voltage $V_O$ 110b.

Carrier generator 54, FIG. 8, may utilize a chopper device symbolized in FIG. 8 by switches 120, 122, 124 and 126 which are operated at, for example, 100 KHz by clock 56 to chop up the DC from controller 78 and the −DC derived from inverter 82 to provide the two square wave carrier voltages $V_C$ and $V_{IC}$, FIG. 9, which are square waves having peak-to-peak voltages of −DC to +DC and are 180° out of phase with each other. Clock 56 operates switches 120, 122, 124 and 126 so that when switches 120 and 126 are closed, switches 122 and 124 are open, and conversely, when switches 120 and 126 are open, switches 122 and 124 are closed.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An r.f. balanced capacitive vibration sensor system, comprising:

a carrier generator for generating an r.f. carrier and an inverted r.f. carrier;

a voltage tunable capacitive vibration sensor, responsive to one of said carriers;

a reference capacitor responsive to the other of said carriers;

a summing device for combining the outputs from said sensor and reference capacitor;

a controller device for adjusting the amplitude of the carriers to tune the capacitance of said sensor to that of said reference capacitor;

said sensor modulating said one of said carriers with a vibration modulation signal representative of a sensed vibration;

an r.f. amplifier device, responsive to said summing device, for amplifying the modulated carrier from said sensor; and a detector device, responsive to said modulated carrier from said r.f. amplifier for detecting the modulation signal, representative of the sensed vibration.

2. The r.f. balanced capacitive vibration sensor system of claim 1 in which said controller device includes an integrator device.

3. The r.f. balanced capacitive vibration sensor system of claim 1 in which said controller device is responsive to said detected modulated signal from said detector device to adjust the amplitude of said carrier.

4. The r.f. balanced capacitive vibration sensor system of claim 1 in which said r.f. amplifier includes a charge amplifier.

5. The r.f. balanced capacitive vibration sensor system of claim 1 in which said R.F. amplifier includes a gain amplifier.

6. The r.f. balanced capacitive vibration sensor system of claim 1 in which said detector device includes a demodulator.

* * * * *